United States Patent
Tsai et al.

(10) Patent No.: US 7,728,946 B2
(45) Date of Patent: Jun. 1, 2010

(54) LIQUID CRYSTAL PANEL WITH HIGH CELL GAP UNIFORMITY AND METHOD FOR CONTROLLING CELL GAP THEREOF

(75) Inventors: Wen-Jung Tsai, Tai Chung (TW); Hong-En Yang, Tai Chung (TW); Yu-Feng Chien, Tai Chung (TW)

(73) Assignee: Wintek Corporation, Taichung (TW)

( * ) Notice: Subject to any disclaimer, the term of this patent is extended or adjusted under 35 U.S.C. 154(b) by 276 days.

(21) Appl. No.: 11/730,370

(22) Filed: Mar. 30, 2007

(65) Prior Publication Data
US 2007/0242208 A1    Oct. 18, 2007

(30) Foreign Application Priority Data
Apr. 14, 2006  (TW) .............................. 95113469 A

(51) Int. Cl.
*G02F 1/1339* (2006.01)
(52) U.S. Cl. .................. 349/153; 349/110; 349/190
(58) Field of Classification Search ............. 349/153, 349/190, 110, 179
See application file for complete search history.

(56) References Cited

U.S. PATENT DOCUMENTS

| | | | |
|---|---|---|---|
| 5,629,787 A | 5/1997 | Tsubota et al. | |
| 5,757,450 A | 5/1998 | Fujii et al. | |
| 6,712,659 B2 | 3/2004 | Chen et al. | |
| 7,061,560 B2 * | 6/2006 | Cheng et al. | 349/111 |
| 7,113,248 B2 * | 9/2006 | Chung et al. | 349/153 |
| 7,436,473 B2 * | 10/2008 | Nam et al. | 349/110 |
| 7,468,775 B2 * | 12/2008 | Lee et al. | 349/153 |
| 2004/0165127 A1 * | 8/2004 | Lin et al. | 349/110 |
| 2004/0252272 A1 * | 12/2004 | Takatori et al. | 349/179 |

* cited by examiner

*Primary Examiner*—David Nelms
*Assistant Examiner*—Thanh-Nhan P Nguyen
(74) *Attorney, Agent, or Firm*—Muncy, Geissler, Olds & Lowe, PLLC

(57) ABSTRACT

A liquid crystal display panel includes a first substrate, a second substrate, a liquid crystal layer, and a black matrix layer. A sealant is put between the first and the second substrates and connecting them to define an enclosed space, and the liquid crystal layer is provided in the enclosed space. An overlap region is formed between the sealant and the first substrate or between the sealant and the second substrate, and only part of the overlap region is spread with the black matrix layer.

4 Claims, 23 Drawing Sheets

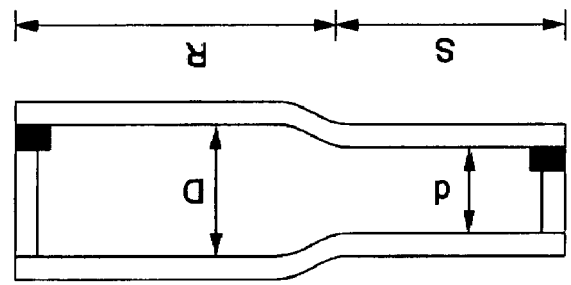
FIG. 8E
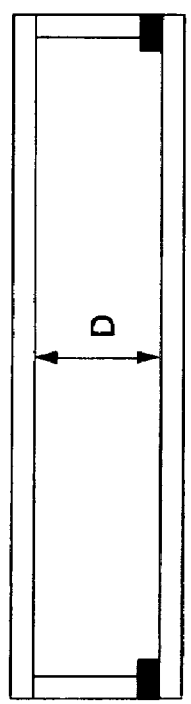
FIG. 8B
FIG. 8C
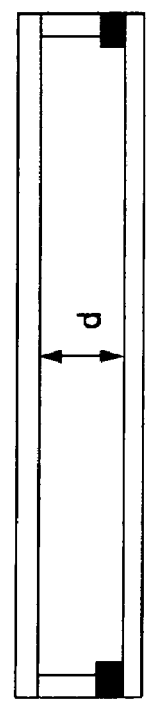
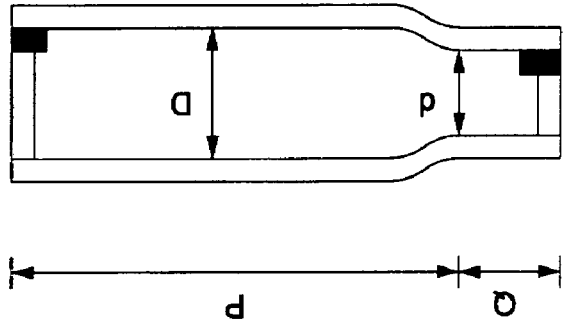
FIG. 8D

| gap thickness | 1 | 2 | 3 | 4 | 5 | 6 |
|---|---|---|---|---|---|---|
| S6 | 4.92 | 4.92 | 5.00 | 5.01 | 4.86 | 4.80 |
| S5 | 5.01 | 4.94 | 5.04 | 5.00 | 4.88 | 4.84 |
| S4 | 4.85 | 4.97 | 5.05 | 5.10 | 4.96 | 4.83 |
| S3 | 4.81 | 4.99 | 5.04 | 5.06 | 4.95 | 4.82 |
| S2 | 4.85 | 4.97 | 5.08 | 5.10 | 4.99 | 4.87 |
| S1 | 4.95 | 5.02 | 5.10 | 5.08 | 4.92 | 4.80 |
| Max | 5.10 | | | | | |
| Min | 4.80 | | | | | |
| Max-Min | 0.30 | | | | | |
| Stdev. | 0.094 | | | | | |

FIG. 9B

| gap thickness | 1 | 2 | 3 | 4 | 5 | 6 |
|---|---|---|---|---|---|---|
| S6 | 4.95 | 5.04 | 5.04 | 5.01 | 5.06 | 5.03 |
| S5 | 5.01 | 4.96 | 5.04 | 5.03 | 5.01 | 5.00 |
| S4 | 4.99 | 4.97 | 5.07 | 5.05 | 5.03 | 4.98 |
| S3 | 4.96 | 4.99 | 5.05 | 5.06 | 5.03 | 4.99 |
| S2 | 4.96 | 5.01 | 5.06 | 5.06 | 4.99 | 5.02 |
| S1 | 4.95 | 4.99 | 5.05 | 5.08 | 4.95 | 5.03 |
| Max | 5.08 | | | | | |
| Min | 4.95 | | | | | |
| Max-Min | 0.13 | | | | | |
| Stdev. | 0.038 | | | | | |

FIG. 10B

LIQUID CRYSTAL PANEL WITH HIGH CELL GAP UNIFORMITY AND METHOD FOR CONTROLLING CELL GAP THEREOF

BACKGROUND OF THE INVENTION (a) Field of the Invention

The invention relates to a liquid crystal display panel with high cell gap uniformity and a method for precisely controlling the cell gap of a liquid crystal display panel.

(b) Description of the Related Art

A liquid crystal display panel commonly includes two insulating substrates placed opposite to each other with a predetermined cell gap in between. The cell gap uniformity of a liquid crystal display panel is a critical factor that affects display performance. If the cell gap at different locations of a panel is not identical, different regions of the panel may achieve their respective phase differences Δnd to result in Mura defect that considerably lowers display performance of a liquid crystal display, particularly a super-twisted nematic liquid crystal display (STN LCD) where an uneven cell gap is always accompanied by uneven display contrast.

Many factors may affect the uniformity of the cell gap of a display panel. For example, when driving electrodes wire outside the active areas of a panel, their distribution density is often not uniform because of a confined layout space. As the wiring density is not uniform, the spacers that control the cell gap thickness may provide different sustaining forces; hence, the region in which the spacers provide larger sustaining forces has a thicker cell gap while the region in which the spacers provide smaller sustaining forces has a thinner cell gap to result in an uneven cell gap of a display panel. Also, the accumulated tolerance of film thickness for laminated layers or various errors from fabrication processes may cause changes in surface flatness to result in an uneven cell gap.

Hence, there are many conventional designs disclosed to improve the cell gap uniformity of a display panel.

As shown in FIG. 1, a method for controlling a cell gap is disclosed in U.S. Pat. No. 6,712,659. Referring to FIG. 1, when upper and lower substrates 104 and 106 are thermally pressed and assembled together by a press means 102, a detector 108 measures the cell gap thickness at a position designated by a transparent hole 110, and than the detected value is fed to a controller 112 so as to adjust the applied force provided by the press means 102 until the cell gap uniformity is satisfied. However, such design requires an accurate optical instrument for dynamically measuring the cell gap thickness to thus significantly increase the cost. Besides, since only one panel is measured for cell gap thickness at a time according to such design, it is not suitable for mass production.

Further, U.S. Pat. No. 5,629,787 discloses a method for adjusting cell gap during the assembly of two opposite substrates. Referring to FIG. 2, an elastic sheet 202 is provided under an adhesive sealant 204 for adjusting the gap thickness of the assembled upper and lower substrates 206 and 208. However, this method needs a special elastic sheet 202 that has specific surface roughness and fabrication precision and thus is complicated to make. This also increases the fabrication cost and is unfavorable for mass production.

Besides, U.S. Pat. No. 5,757,450 discloses a method for increasing cell gap uniformity by adjusting wiring density of transparent electrodes. As shown in FIG. 3, conventional terminals 304 extending from transparent electrodes 302 often have inclined wiring arrangement, so the transparent electrodes 302 have relatively low wiring density at their edge portions to affect the cell gap uniformity. Hence, according to this method, dummy electrodes 306 are additionally provided at low-wiring-density edge portions to improve the cell gap uniformity. However, this technique cures the uneven cell gap only as a result of uneven electrode wiring density but fails to solve that problem caused by other factors.

BRIEF SUMMARY OF THE INVENTION

An object of the invention is to provide a liquid crystal display (LCD) panel with high cell gap uniformity and a method for precisely controlling the cell gap of an LCD panel without changing the structure and fabrication processes of the LCD panel or requiring additional members.

According to the invention, a liquid crystal display panel includes a first substrate, a second substrate, a liquid crystal layer, and a black matrix layer. A sealant is put between the first and the second substrates and connecting them to define an enclosed space, and the liquid crystal layer is provided in the enclosed space. An overlap region is formed between the sealant and the first substrate or between the sealant and the second substrate, and only part of the overlap region is spread with the black matrix layer. Thus, the whole distributed positions and areas of the black matrix layer in the overlap region are adjusted to maintain the cell gap uniformity of the panel.

Further, the invention provides a method for controlling the cell gap of an LCD panel. First, the liquid crystal display panel is divided into a plurality of zones and then the gap thickness for each zone is measured, wherein a zone having a gap thickness higher than a standard value is defined as a thick-gap zone and a zone having a gap thickness lower than a standard value is defined as a thin-gap zone. Next, the thick-gap and thin-gap zones are compared with the distribution positions of the adhesive sealant to define a first overlap region that corresponds the thick-gap zones and a second overlap region that corresponds the thin-gap zones. Finally, a black matrix layer of the LCD panel is formed outside the first overlap region and inside the second overlap region.

Through the design of the invention, since the black matrix layer is inherent in a LCD panel, the adjustment method according to the invention, where the distribution of the black matrix layer relative to the position of the adhesive sealant is modified to compensate the gap thickness difference, may considerably improve the cell gap uniformity as well as the display performance, without changing the structure and fabrication processes of the LCD panel or requiring additional members.

BRIEF DESCRIPTION OF THE DRAWINGS

FIGS. 9A, 9B, 10A, and 10B show the measurement of cell gap thicknesses to illustrate the adjustment effect achieved by the invention.

DETAILED DESCRIPTION OF THE INVENTION

Figure 1:
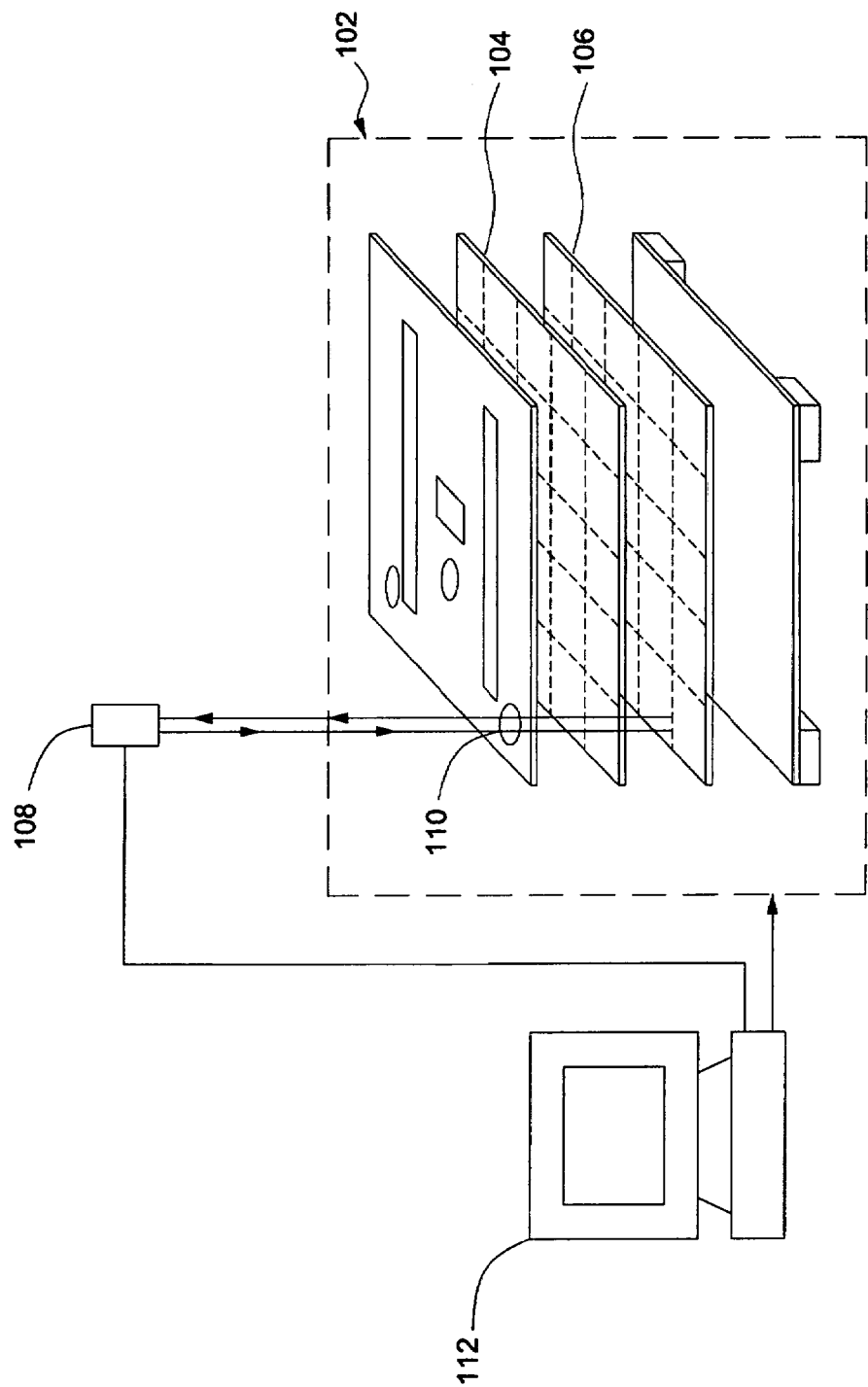
FIG. 1 shows a schematic diagram illustrating a conventional method for adjusting the cell gap of an LCD panel.
Figure 2:
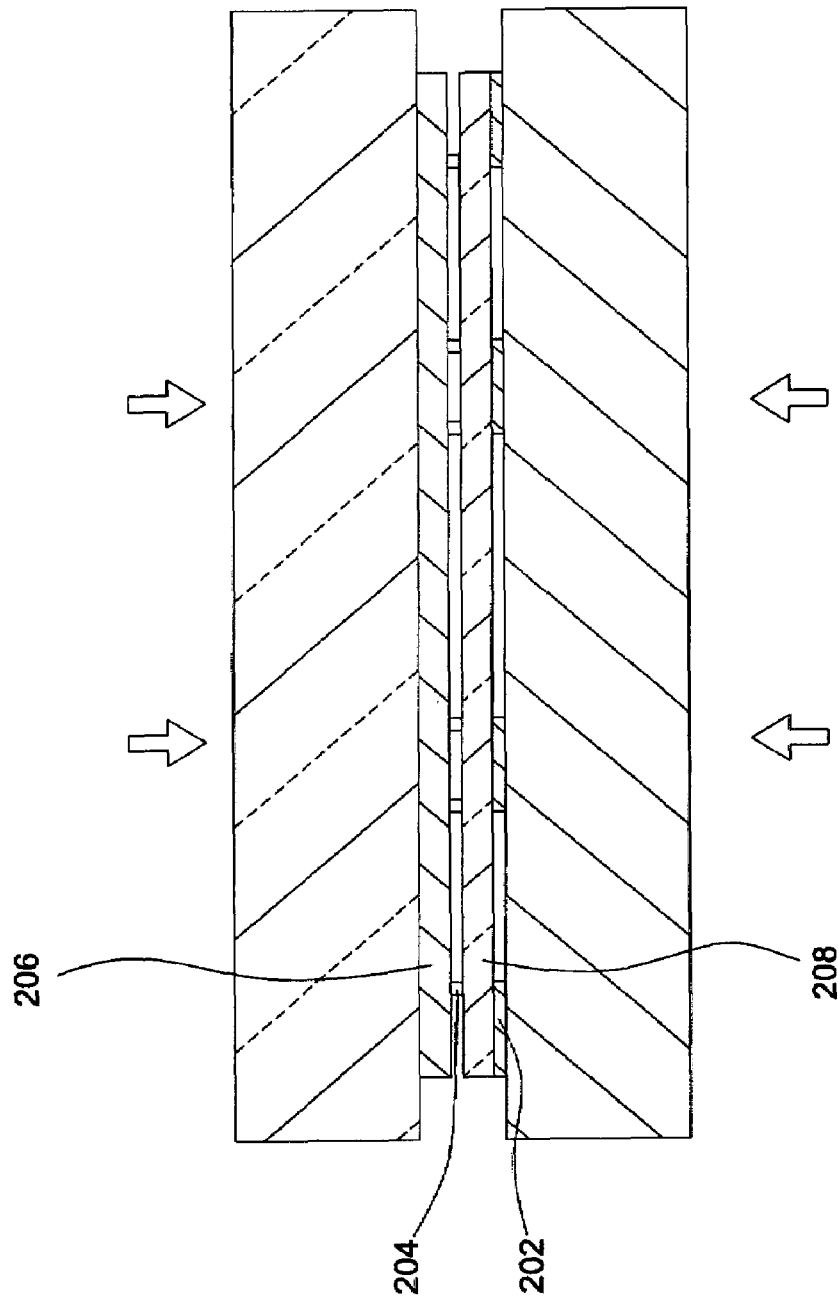
FIG. 2 shows a schematic diagram illustrating another conventional method for adjusting the cell gap of an LCD panel.
Figure 3:
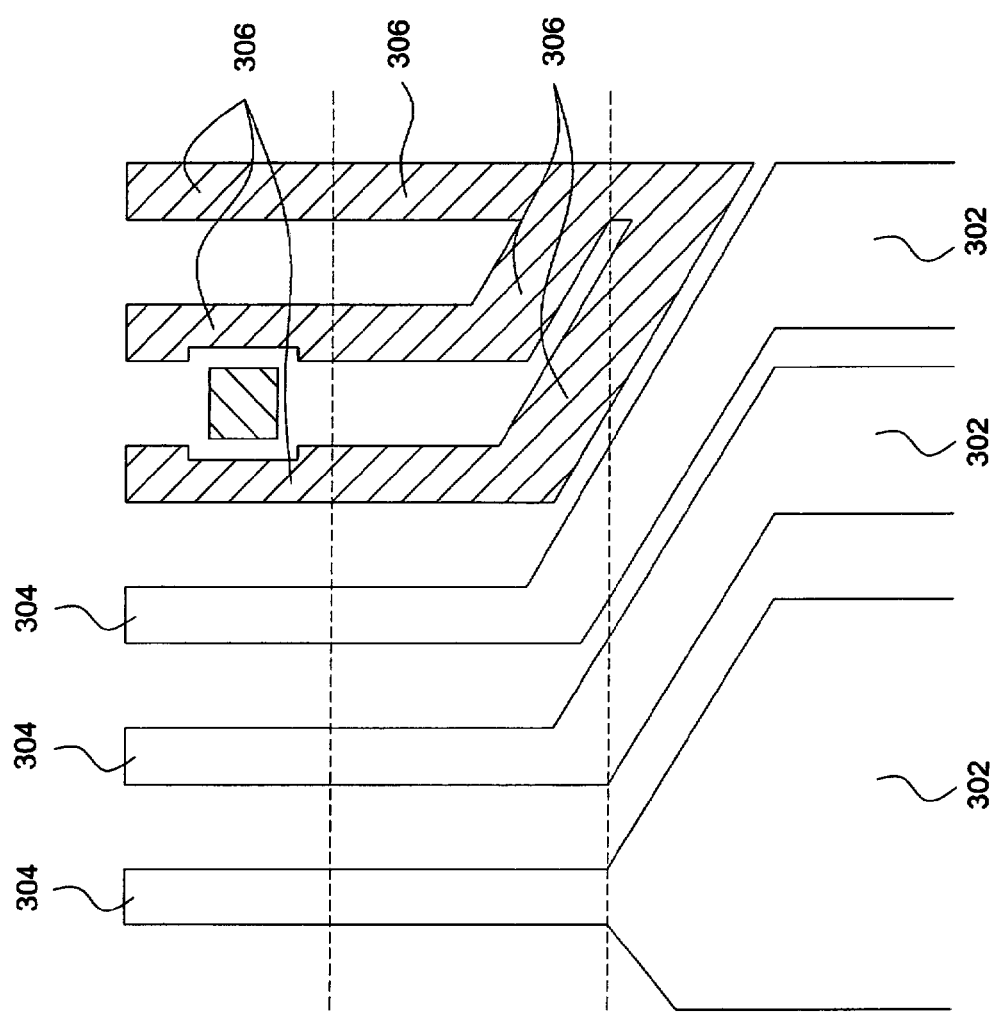
FIG. 3 shows a schematic diagram illustrating another conventional method for adjusting the cell gap of an LCD panel.
Figure 4:
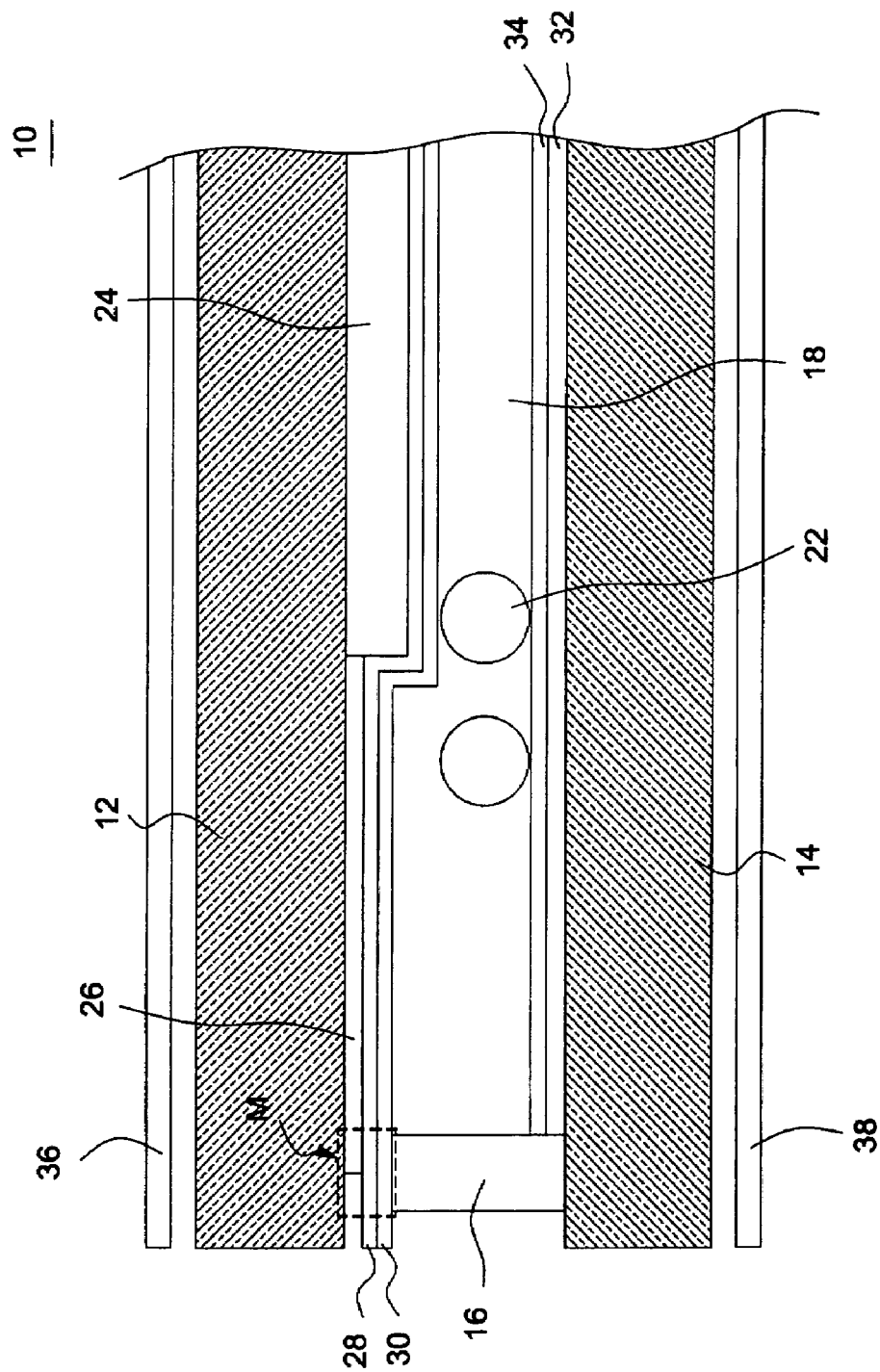
FIG. 4 shows a partial cross-sectional schematic diagram illustrating a super-twisted nematic liquid crystal display (STN LCD) panel according to an embodiment of the invention.

FIG. 4 shows a partial cross-sectional schematic diagram illustrating a super-twisted nematic liquid crystal display (STN LCD) panel 10 according to an embodiment of the invention. As shown in FIG. 4, the STN LCD panel 10 includes a first substrate 12 and a second substrate 14 opposing to each other and assembled together by a sealing material, such as an adhesive sealant 16, so as to form an enclosed space into which liquid crystal materials are filled to form a liquid crystal layer 18. Moreover, spacers 22 made of glass or resin are distributed in the liquid crystal layer 18 to maintain a certain gap thickness of the STN LCD panel 10. Color filters 24, a black matrix layer 26 for separating color filters 24 with different colors, a transparent electrode 28, and an alignment layer 30 are formed on the side of the first substrate 12 facing the liquid crystal layer 18. A transparent electrode 32 and an alignment layer 34 are formed on the side of the second substrate 14 facing the liquid crystal layer 18. A first polarizer 36 is positioned in one side of the first substrate 12 opposite to the liquid crystal layer 18, and a second polarizer 38 is positioned in one side of the second substrate 14 opposite to the liquid crystal layer 18.

As indicated by the dashed lines shown in FIG. 4, an overlap region M is formed between the adhesive sealant 16 and the substrate 12 in the STN LCD panel 10. As used in this description and in the appended claims, the term "overlap region" formed between the adhesive sealant and the substrate covers the projection area of the end surface of the adhesive sealant on the substrate. Thus, as the distribution of the black matrix layer 26 is extended to the interior of the overlap region M, the gap thickness is increased; in contrast, as the distribution of the black matrix layer 26 is shrunk outside of the overlap region M, the gap thickness is decreased. According to the invention, only part of the overlap region M is designed to have the distribution of the black matrix layer 26 so as to provide a mechanism for cell gap adjustment. That is, the distributed positions and areas of the black matrix layer 26 relative to the overlap region M can be adjusted according to actual cell gap thicknesses to maintain the cell gap uniformity. Typically, for a STN LCD, the variation of phase differences Δnd due to different cell gap thicknesses may seriously affect the display performance. Thus, FIG. 4 uses the STN LCD panel 10 as an example. However, it should be understood that the method for controlling the cell gap and the following adjustment examples are applied to not only a passive matrix LCD, such as the STN LCD, but also an active matrix LCD, such as a thin-film-transistor LCD (TFT LCD). For the case of a TFT LCD, the first substrate 12 is a color filter substrate and the second substrate 14 is a TFT substrate. The following examples are used to explain in detail the method for adjusting cell gap thicknesses to obtain high cell gap uniformity.

Figure 5A:
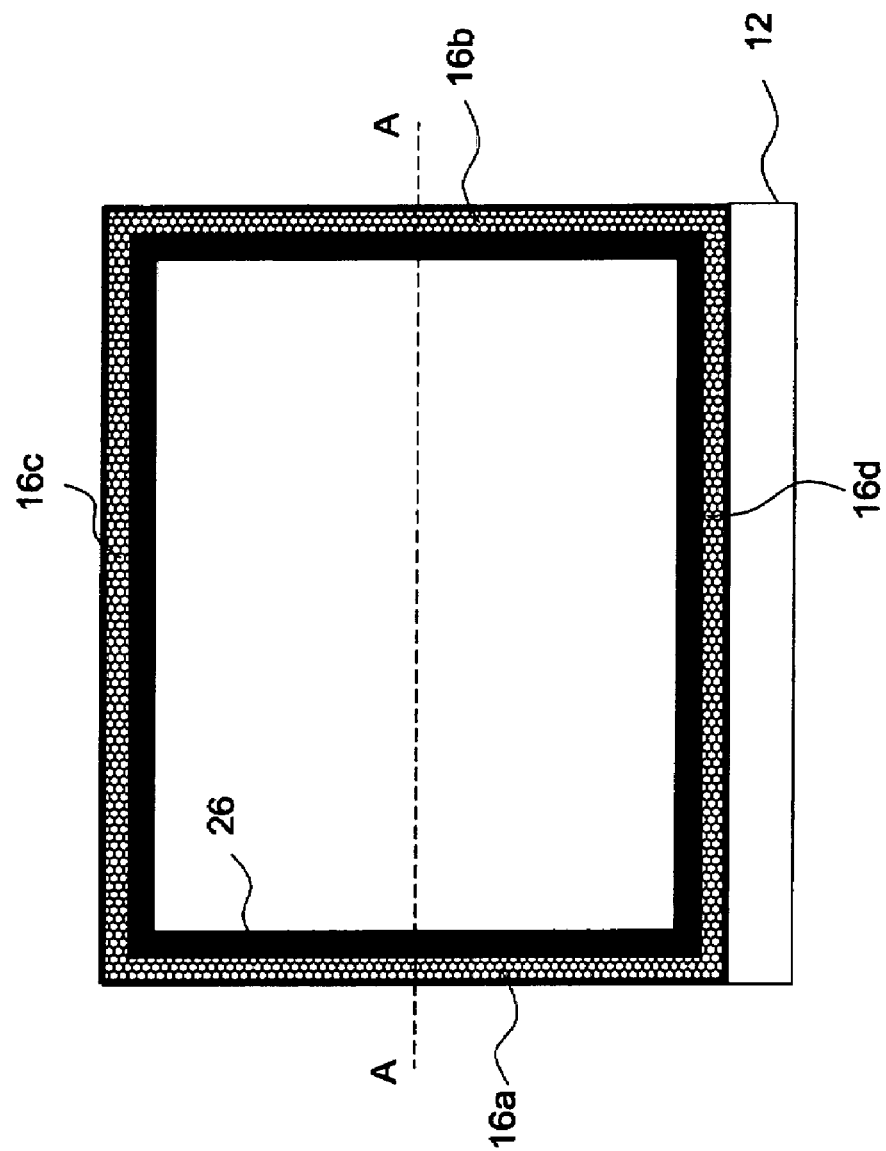
FIG. 5A shows a simplified top view of a conventional LCD panel.
Figure 5B:
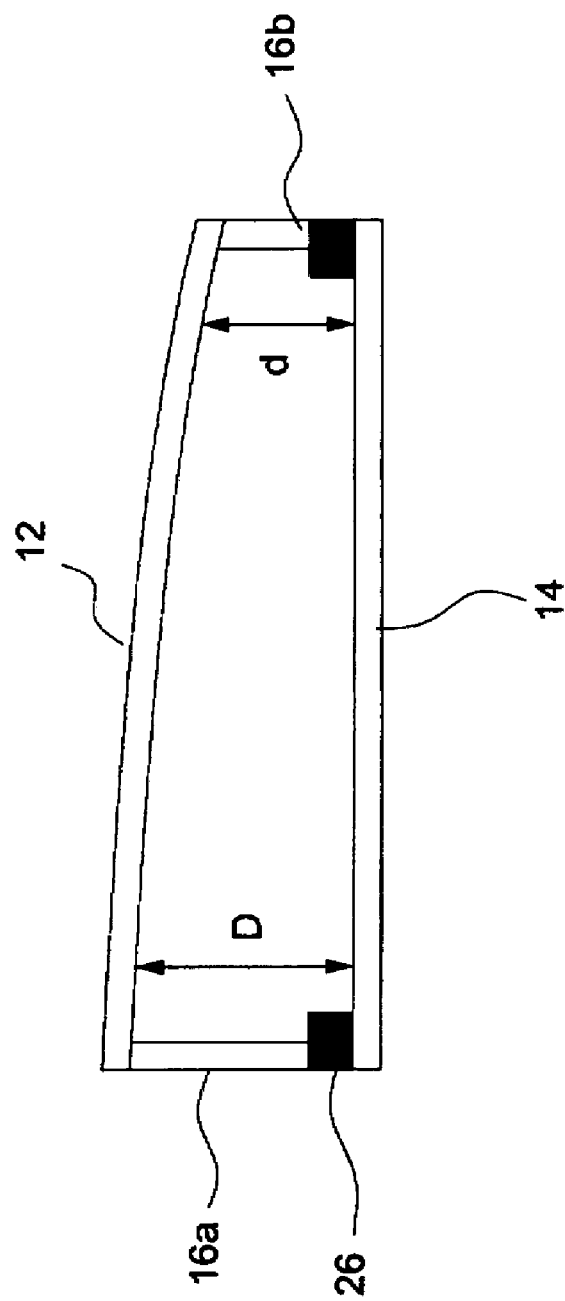
FIG. 5B shows a cross-sectional diagram along line A-A in FIG. 5A.

FIG. 5A shows a simplified top view of a conventional LCD panel, where a conventional distribution of a black matrix layer 26 and an adhesive sealant 16 on a substrate 12 is shown. FIG. 5B shows a cross-sectional diagram along line A-A in FIG. 5A, FIG. 5C shows a simplified top view of the LCD panel with an adjusted cell gap according to a first embodiment of the invention, and FIG. 5D shows a cross-sectional diagram along line A'-A' in FIG. 5C.

As show in FIG. 5A, the adhesive sealant 16 includes four striped segments 16a, 16b, 16c, and 16d that together form a rectangle. Hence, according to the definition of the overlap region M, in this embodiment the overlap region M also includes four striped segments to define a rectangle. Referring to FIG. 5A, in the conventional design, the black matrix layer 26 fills the entire overlap region M between the adhesive sealant 16 and the substrate 12. That is, each striped segment of the overlap region is completely filled with the black matrix layer 26. Next, as shown in FIG. 5B, after the cell gap of the conventional LCD panel is measured, it can be seen the gap thickness D on the left-hand side of the panel (corresponding to the adhesive sealant segment 16a) is larger than the gap thickness d on the right-hand side (corresponding to the adhesive sealant segment 16b).

Figure 5C:
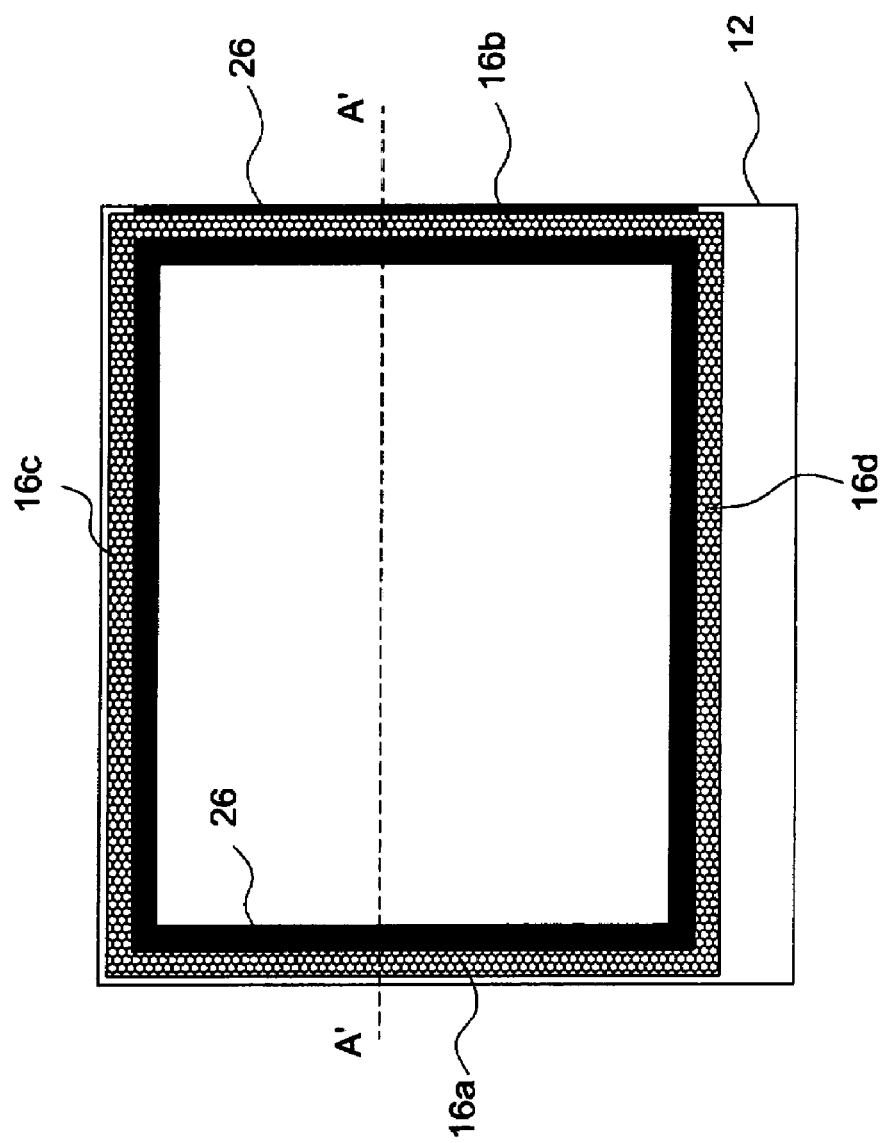
FIG. 5C shows a simplified top view of the LCD panel with an adjusted cell gap according to a first embodiment of the invention.
Figure 5D:
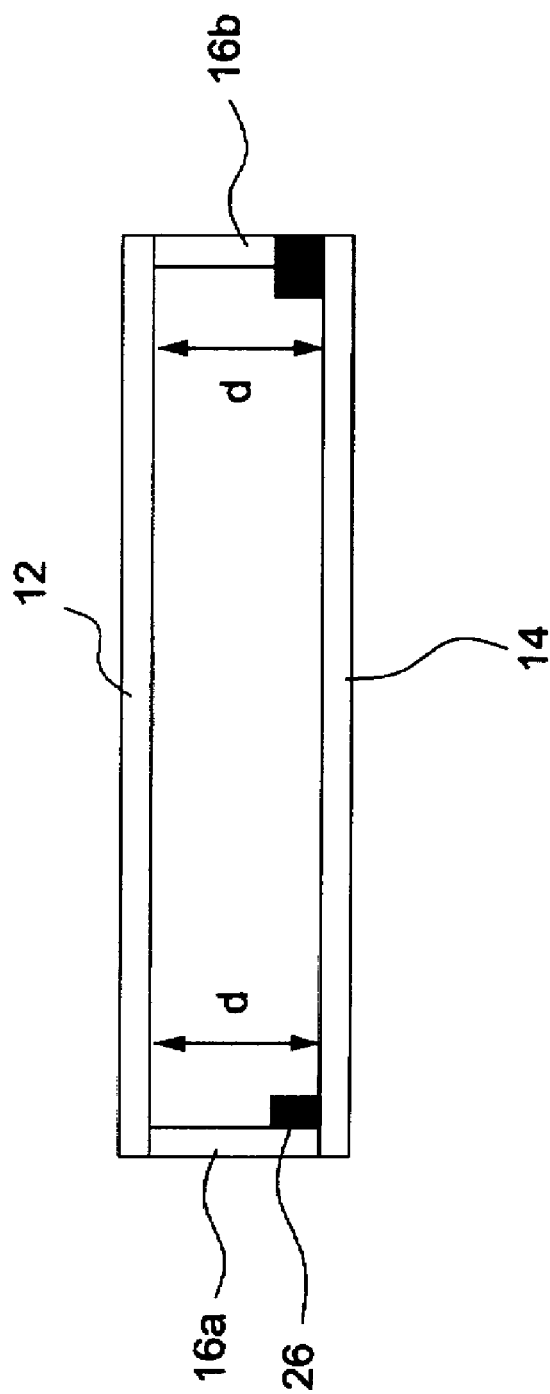
FIG. 5D shows a cross-sectional diagram along line A'-A' in FIG. 5C.

Hence, referring to FIG. 5C, according to this embodiment the overlap region M between the adhesive sealant segment 16a and the substrate 12 is designed to contain no black matrix layer 26 (the black matrix layer 26 is shrunk outside of the overlap region M), and the overlap region M between the adhesive sealant segment 16b and the substrate 12 is completely filled with the black matrix layer 26. Thus, by the compensation of the thickness of the black matrix layer, the cell gap thicknesses on the two opposite sides become nearly the same so as to provide a display panel with better uniformity, as clearly seen in FIG. 5D.

Figure 6A:
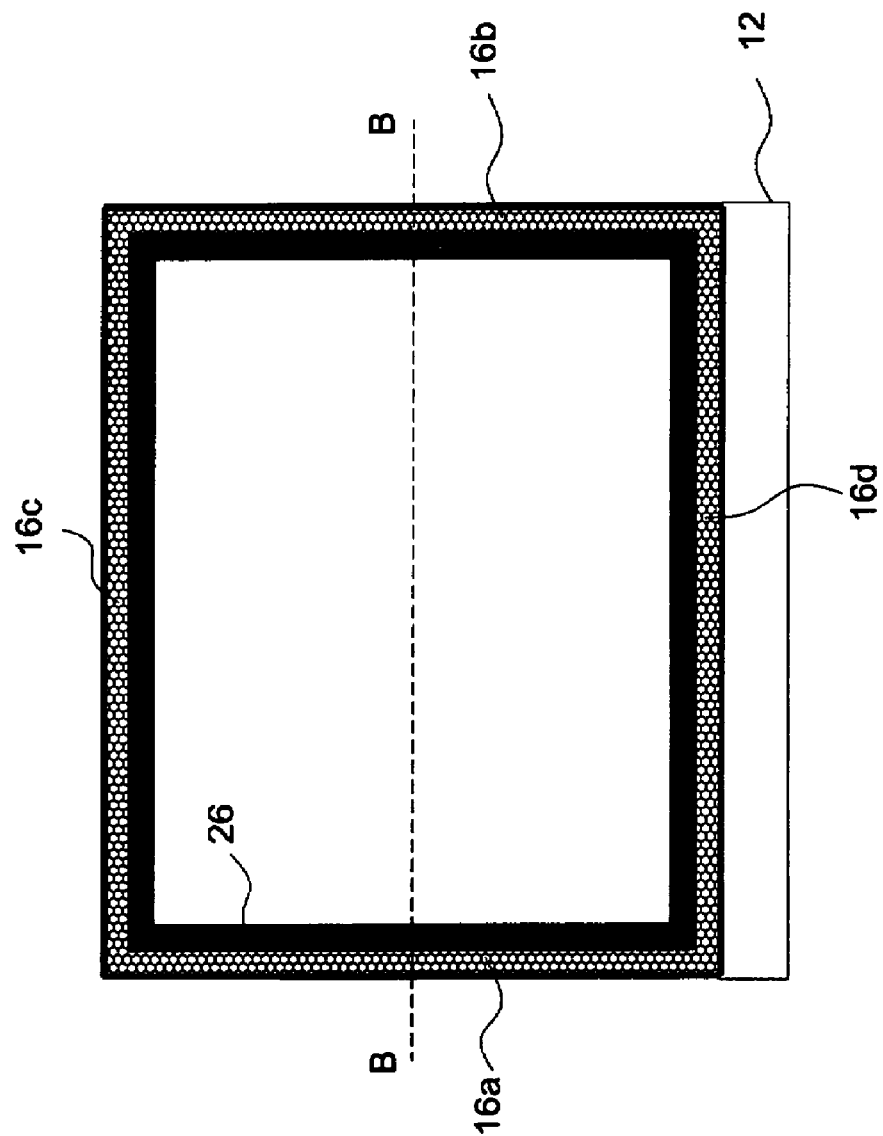
FIG. 6A shows a simplified top view of a conventional LCD panel.
Figure 6B:
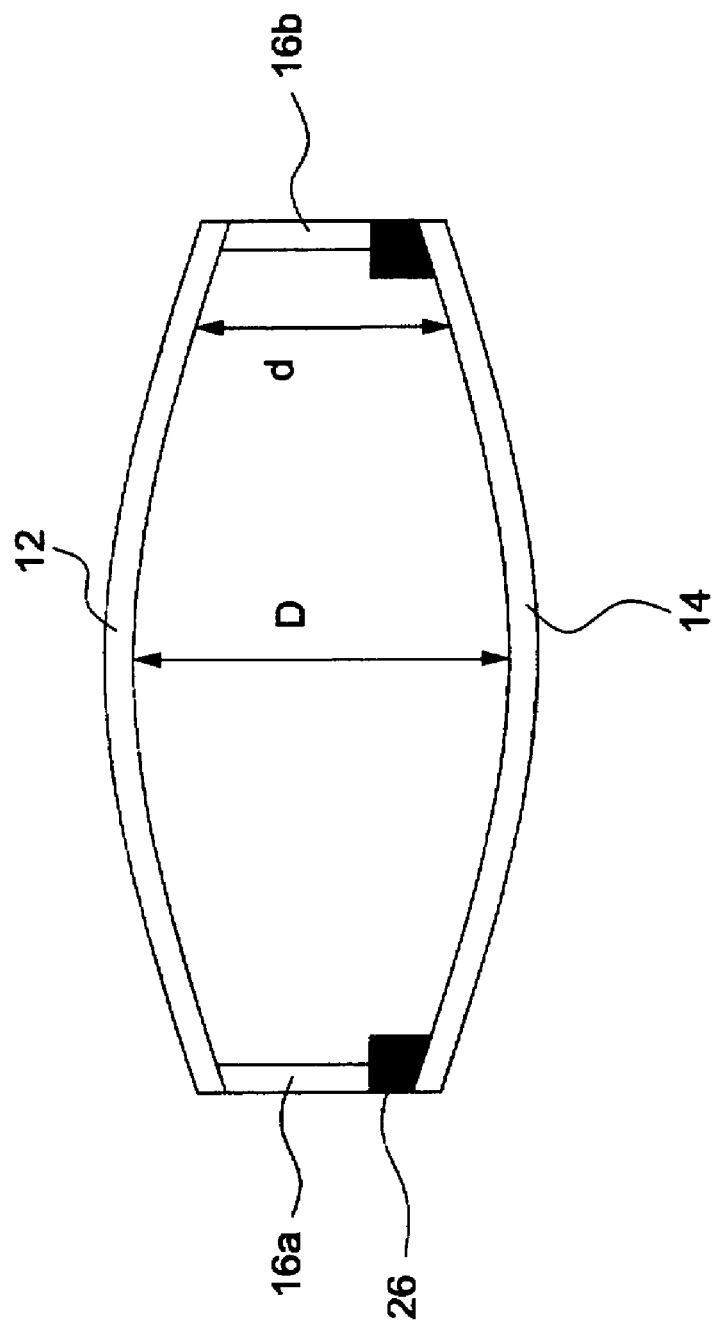
FIG. 6B shows a cross-sectional diagram along line B-B in FIG. 6A.
Figure 6C:
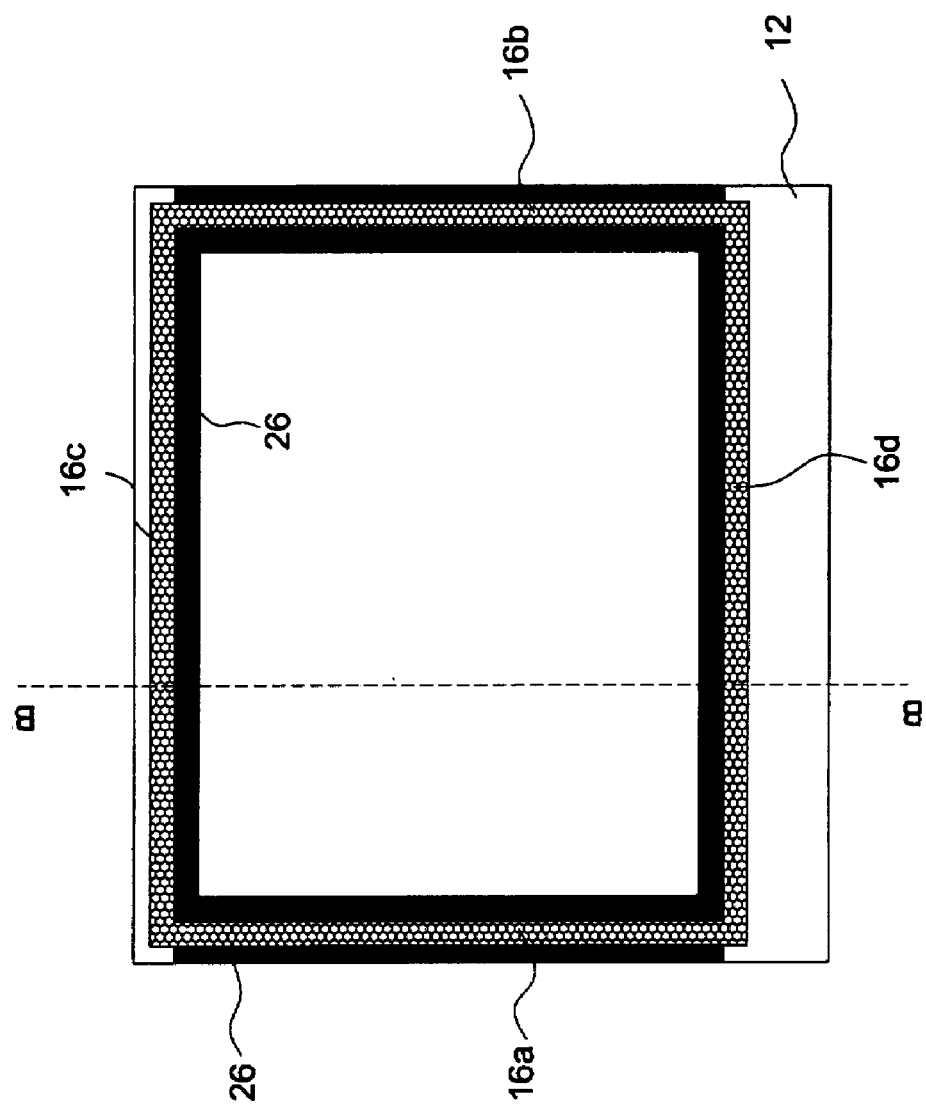
FIG. 6C shows a simplified top view of the LCD panel with an adjusted cell gap according to a second embodiment of the invention.
Figure 6D:
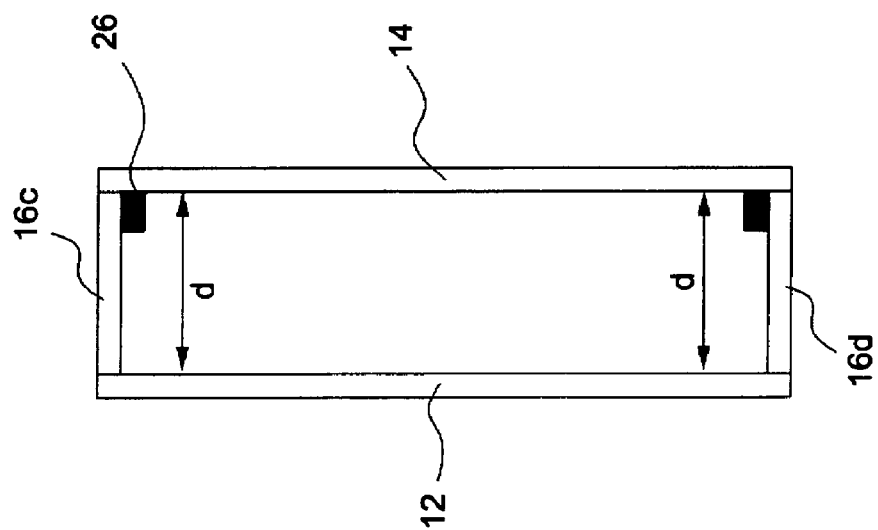
FIG. 6D shows a cross-sectional diagram along line B'-B' in FIG. 6C.

FIG. 6A shows a simplified top view of a conventional LCD panel, where a conventional distribution of a black matrix layer 26 and an adhesive sealant 16 on a substrate 12 is shown. FIG. 6B shows a cross-sectional diagram along line B-B in FIG. 6A, FIG. 6C shows a simplified top view of the LCD panel with an adjusted cell gap according to a second embodiment of the invention, and FIG. 6D shows a cross-sectional diagram along line B'-B' in FIG. 6C.

As shown in FIGS. 6A and 6B, the gap thickness D at the center of the panel is larger than the gap thickness d on the left-hand and right-hand sides (corresponding to the adhesive sealant segments 16a and 16b). Therefore, as shown in FIG. 6C, according to this embodiment, the overlap region M between the adhesive sealant segment 16a and the substrate 12 and between the adhesive sealant segment 16b and the substrate 12 are completely filled with the black matrix layer 26, while the overlap region M between the adhesive sealant segments 16c and the substrate 12 and between the adhesive sealant segments 16d and the substrate 12 is designed to contain no black matrix layer 26. Under the circumstance, the cell gap thicknesses on the left-hand and right-hand sides become nearly the same as that at the center of the panel, as clearly seen in FIG. 6D. Note that, in the following embodiments, the cross section of an LCD panel having a cell gap adjusted according to the invention is not repeatedly depicted for simplification, since the thickness compensation manner in the following embodiments is similar to that shown in FIG. 5D or FIG. 6D.

Figure 7A:
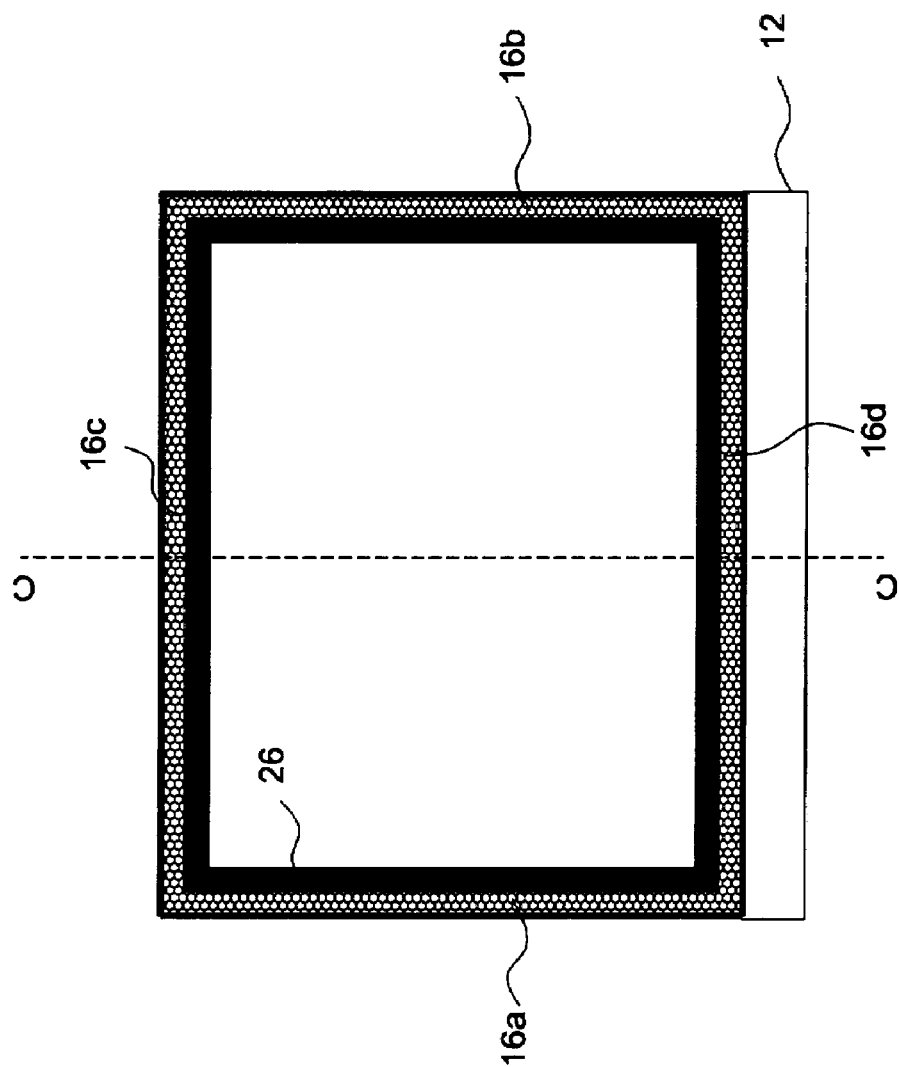
FIG. 7A shows a simplified top view of a conventional LCD panel.
Figure 7B:
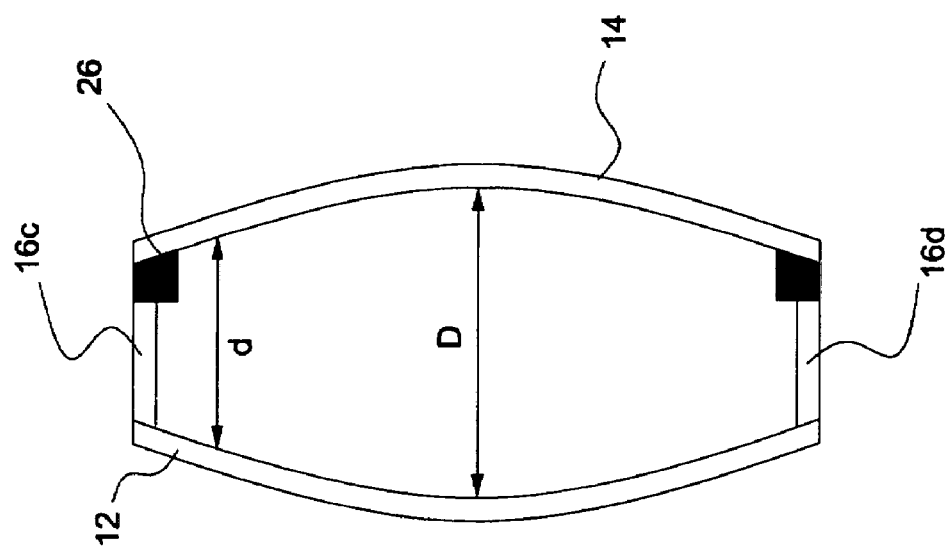
FIG. 7B shows a cross-sectional diagram along line C-C in FIG. 7A.
Figure 7C:
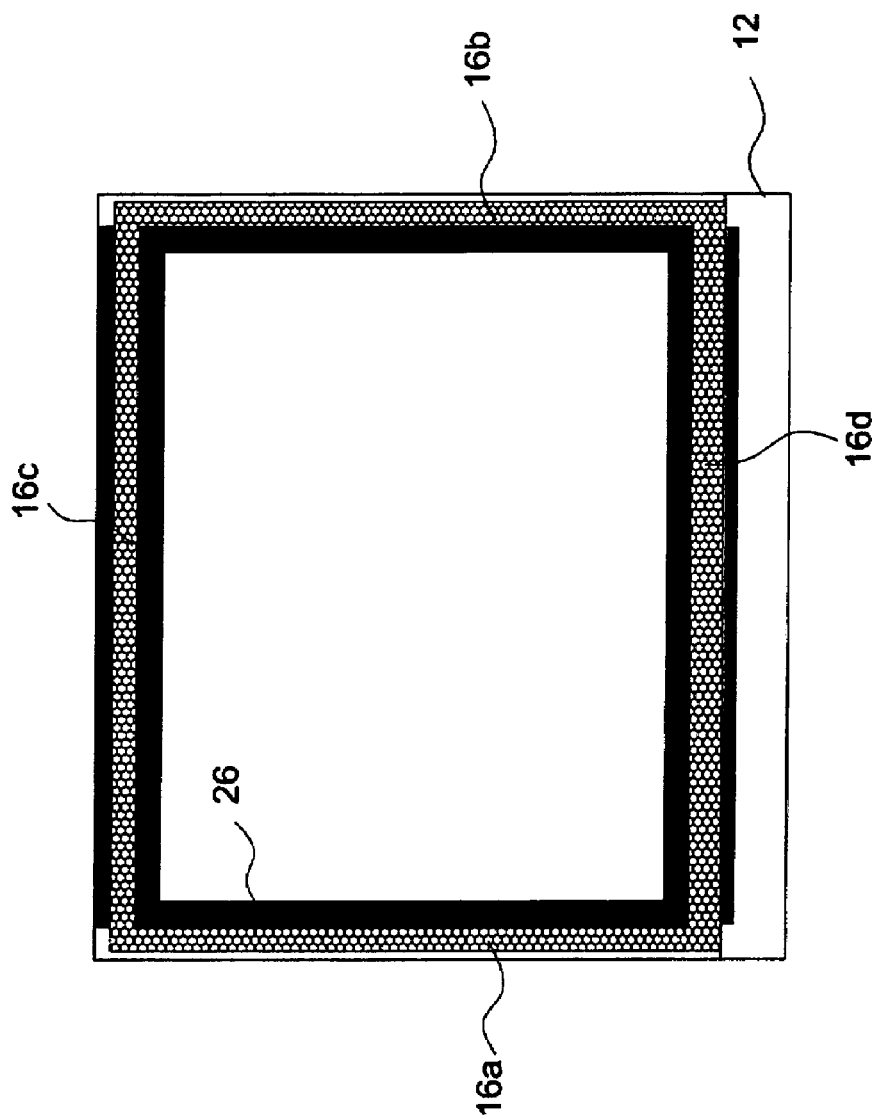
FIG. 7C shows a simplified top view of the LCD panel with an adjusted cell gap according to a third embodiment of the invention.

FIG. 7A shows a simplified top view of a conventional LCD panel. FIG. 7B shows a cross-sectional diagram along line C-C in FIG. 7A, and FIG. 7C shows a simplified top view of the LCD panel with an adjusted cell gap according to a third embodiment of the invention.

As shown in FIGS. 7A and 7B, the gap thickness D at the center of the panel is larger than the gap thickness d on the upper and lower sides (corresponding to the adhesive sealant segments 16c and 16d). Therefore, as shown in FIG. 7C, according to this embodiment, the overlap region M between the adhesive sealant segment 16c and the substrate 12 and between the adhesive sealant segment 16d and the substrate 12 are completely filled with the black matrix layer 26, while the overlap region M between the adhesive sealant segments 16a and the substrate 12 and between the adhesive sealant segments 16b and the substrate 12 are designed to contain no black matrix layer 26. Under the circumstance, the cell gap thicknesses on the upper and lower sides become nearly the same as that at the center of the panel.

Figure 8A:
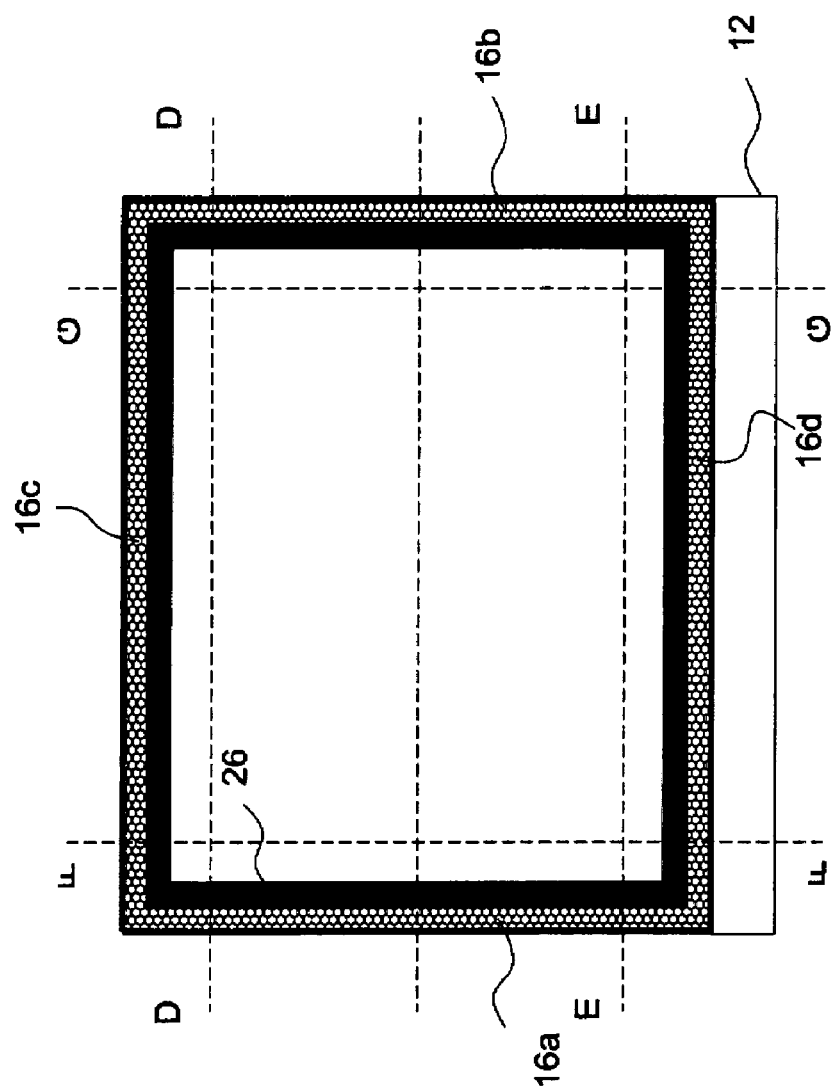
FIG. 8A shows a simplified top view of a conventional LCD panel, and FIGS. 8B, 8C, 8D, and 8E respectively show cross-sectional diagrams along lines D-D, E-E, F-F, and G-G in FIG. 8A.
Figure 8F:
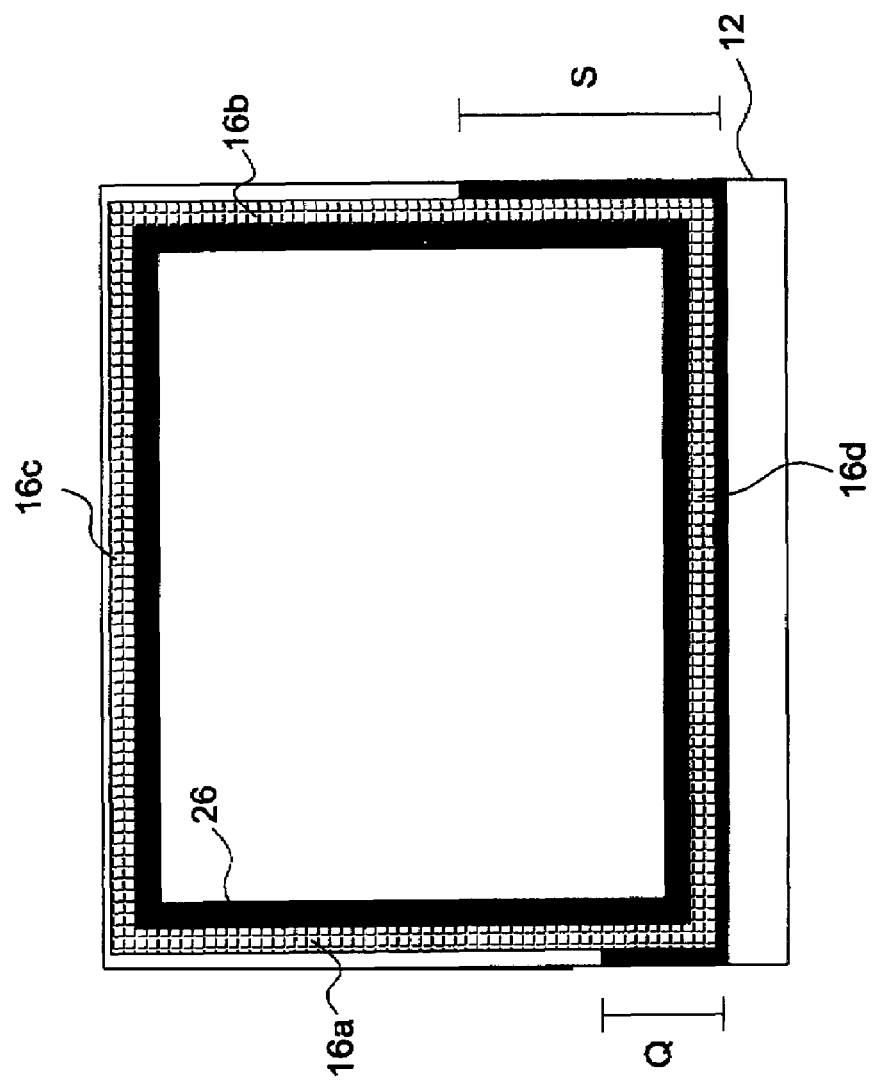
FIG. 8F shows a simplified top view of the LCD panel with an adjusted cell gap according to a fourth embodiment of the invention.

FIG. 8A shows a simplified top view of a conventional LCD panel, and FIGS. 8B, 8C, 8D, and 8E respectively show cross-sectional diagrams along lines D-D, E-E, F-F, and G-G in FIG. 8A. FIG. 8F shows a simplified top view of the LCD panel with an adjusted cell gap according to a fourth embodiment of the invention.

From these cross-sectional diagrams, it can be seen the gap thickness on the lower side (corresponding to the adhesive sealant segment 16d) is smaller than that on the upper side (corresponding to the adhesive sealant segment 16c). Also, the gap thickness distribution is not uniform on the left-hand side (corresponding to the adhesive sealant segment 16a); that is, the gap thickness D on the upper portion P is larger than the gap thickness d on the lower portion Q. Besides, the gap thickness distribution is not uniform on the right-hand side (corresponding to the adhesive sealant segment 16b); that is, the gap thickness D on the upper portion R is larger than the gap thickness d on the lower portion S. Therefore, as shown in FIG. 8F, according to this embodiment, the black matrix layer 26 is designed to fill the entire overlap region M between the adhesive sealant segment 16d and the substrate 12 and to contain no black matrix layer 26 in the overlap region M between the adhesive sealant segment 16c and the substrate 12. In addition, the overlap region M that corresponds to the lower portion Q in the left-hand side having a smaller gap thickness d is completely filled with the black matrix layer 26 while the overlap region M that corresponds to the upper portion P contains no black matrix layer 26. Further, the overlap region M that corresponds to the lower portion S in the right-hand side having a smaller gap thickness d is completely filled with the black matrix layer 26 while the overlap region M that corresponds to the upper portion R in the right-hand side contains no black matrix layer 26. Thus, it is seen the cell gap adjustment method according to the invention is not limited to an adjustment of the whole side, but rather it depends on the actual gap thickness distribution to adjust the distributed positions and areas of the black matrix layer 26 on each side.

Also, according to the invention, the distribution of the black matrix layer 26 in the overlap region M between the adhesive sealant 16 and the substrate 12 is not restricted to a specific manner. The black matrix layer 26 may entirely fill each striped segment or only fill a portion of each striped segment of the overlap region M. As the black matrix layer 26 fills only a portion of each striped segment, filling amount and position in one striped segment can be arbitrary selected to thus fine-tune the cell gap thickness. On the other hand, though the black matrix layer 26, as shown in FIG. 4, is exemplified as being formed on the first substrate 12, it can be formed on the second substrate 14 as light-shading bars for shielding thin-film transistors 32 or metallic terminals (not shown). In that case, the method for controlling cell gap can also be applied between the adhesive sealant 16 and the second substrate 14, or can simultaneously adjust the distribution of the black matrix layer 26 between the adhesive sealant 16 and the first substrate 12 and between the adhesive sealant 16 and the second substrate 14 so as to obtain a more extensive range for adjusting the gap thickness.

Further, according to the invention, the thickness of the black matrix layer is determined according to the possible adjustment range of the gap thickness of the panel so as to optimize the compensation effect. For example, in the case of the second embodiment shown in FIG. 6B, the gap thickness difference (D minus d) is 0.3 um. If the thickness of the black matrix layer is set to be 0.15 um, through the adjustment shown in FIG. 6C the gap thickness difference (D minus d) is only reduced from 0.3 um to 0.15 um. In comparison, if the thickness of the black matrix layer is increased to be 0.3 um, the optimum compensation is achieved with the gap thickness difference (D minus d) to be zero.

Through the design of the invention, since the black matrix layer 26 is inherent in a LCD panel, the adjustment method according to the invention, where the distribution of the black matrix layer 26 relative to the position of the adhesive sealant 16 is modified to compensate the gap thickness difference, may considerably improve the cell gap uniformity as well as the display performance, without changing the structure and fabrication processes of the LCD panel or requiring additional members.

Figure 9A:
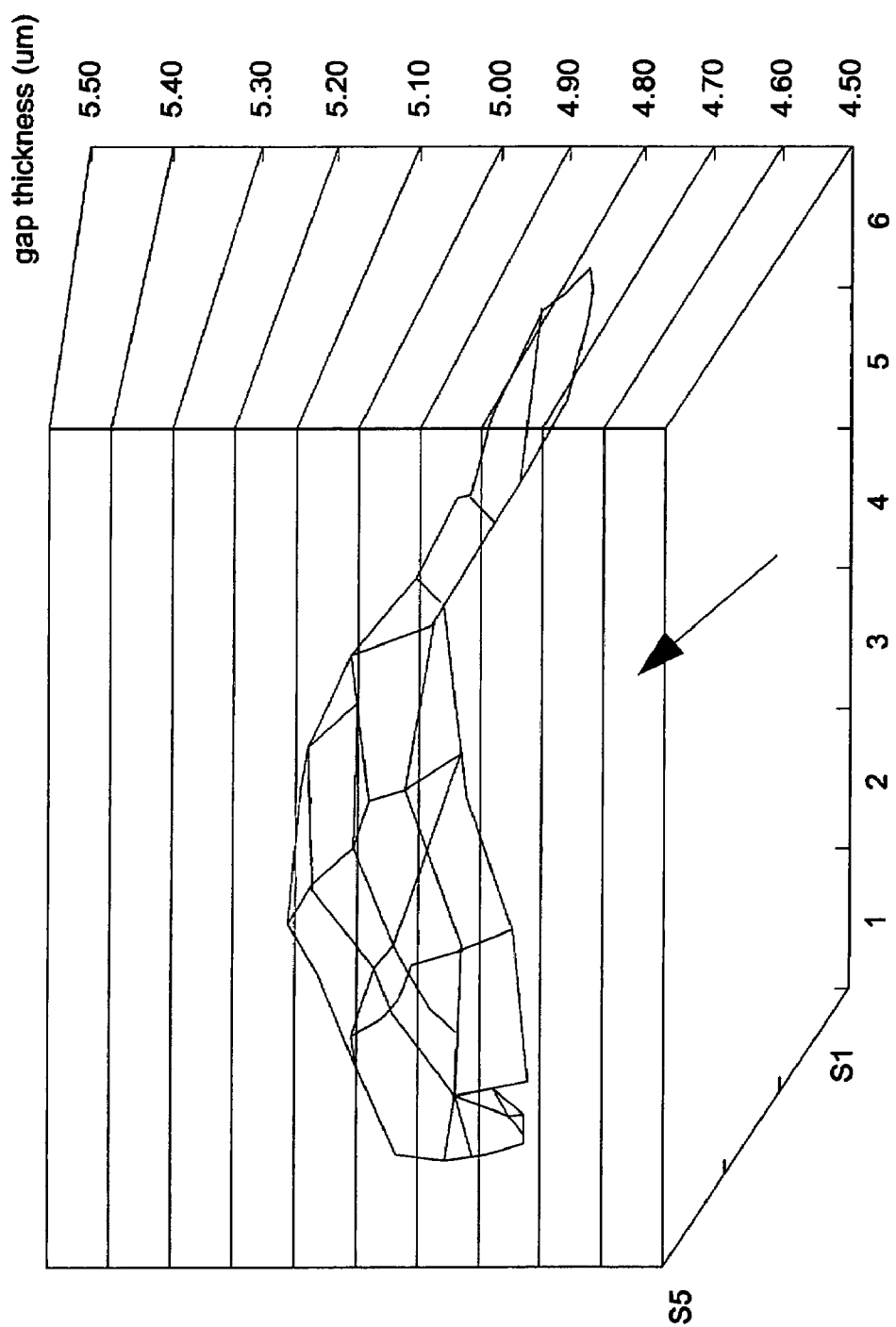
Figure 10A:
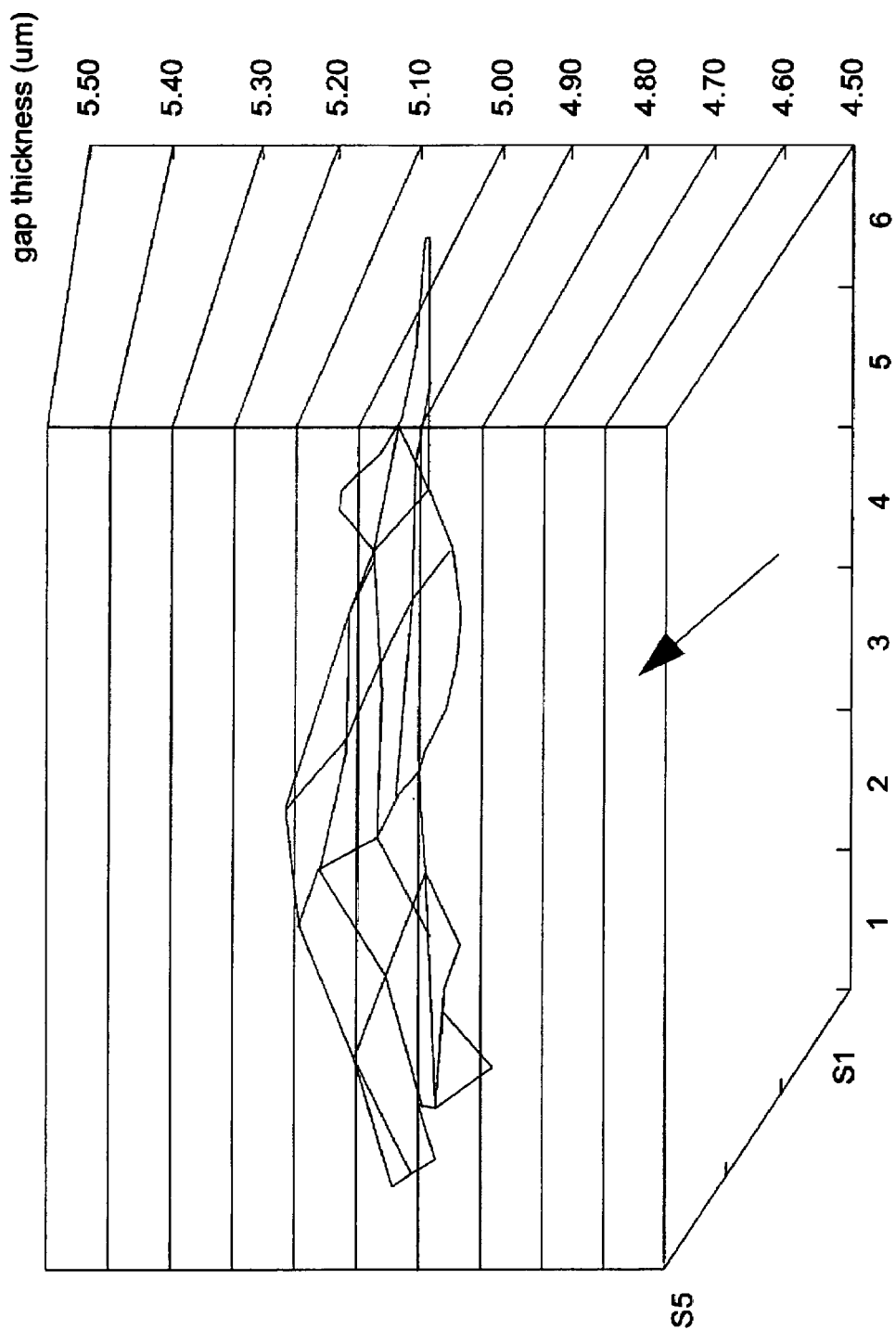

FIGS. 9A, 9B, 10A, and 10B show the measurement of cell gap thicknesses to illustrate the adjustment effect achieved by the invention. FIG. 9A shows a graphic depicted according to the measured values listed in FIG. 9B, where the gap thicknesses at the center of the panel are larger than those on the left-hand and right-hand sides. After the distribution of the black matrix layer 26 relative to the position of the adhesive sealant 16 is modified to compensate the gap thickness difference, the gap thicknesses on the left-hand and right-hand sides obviously approach those at the center of the panel to have better cell gap uniformity, which can be seen from FIGS. 10A and 10B.

Figure 11:
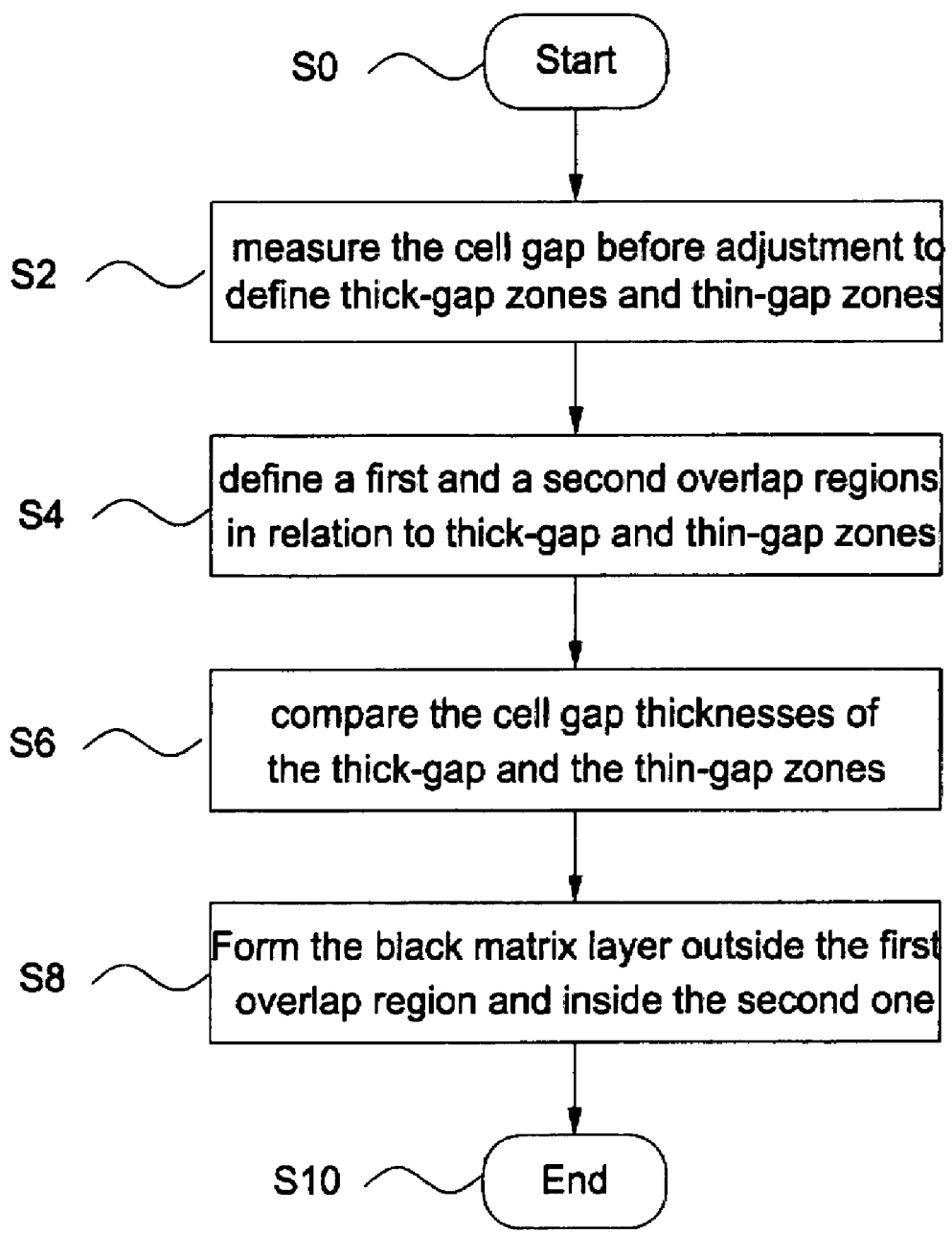
FIG. 11 shows a flow chart illustrating the method for controlling the cell gap according to the invention.

FIG. 11 shows a flow chart illustrating the method for controlling the cell gap of an LCD panel according to the invention. The method includes the following steps.

Step S0: Start

Step S2: Divide an LCD panel into a plurality of zones and measure the cell gap thickness for each zone. At the time, the cell gap thickness is measured under the condition where the black matrix layer entirely fills the overlap region or completely forms outside of the overlap regions between the adhesive sealant and the substrate. The measured cell gap thickness at this stage is used as reference values for adjustment, and the zone having a cell gap thickness higher than a standard value is defined as a thick-gap zone while the zone having a cell gap thickness lower than the standard value is defined as a thin-gap zone. The standard value may be the average value of the cell gap thicknesses of all zones.

Step S4: Recognize the positions of the thick-gap and thin-gap zones in relation to the adhesive sealant to define a first overlap region corresponding to the thick-gap zones and a second overlap region corresponding to the thin-gap zones.

Step S6: Compare the cell gap thicknesses of the thick-gap zones with those of the thin-gap zones to determine an optimum thickness of the black matrix layer of the LCD panel.

Step S8: Form the black matrix layer outside the first overlap region and inside the second overlap region.

Step S10: End.

Note that the step S6 for comparing the cell gap thicknesses between the thick-gap zones and the thin-gap zones is merely to obtain an optimum thickness for the black matrix layer but not essential to achieve the effect of the invention.

In addition, though in above embodiments the overlap region between the adhesive sealant and the substrate includes four striped segments that form a rectangle, this is not limited. The number and shape of the striped segments can be arbitrary selected to form an arbitrary polygon, as long as the cell gap compensation effect is provided.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liqiuid crystal display panel with high cell gap uniformity, comprising:
    a first substrate;
    a second substrate;
    a sealant put between the first and the second substrates and connecting them to define an enclosed space;
    a liquid crystal layer provided in the enclosed space; and
    a black matrix layer formed on one side of the first substrate or one side of the second substrate, with the side of the substrate on which the black matrix layer is formed facing the liquid crystal layer;
    wherein an overlap region is formed between the sealant and the first substrate or between the sealant and the second substrate, only part of the overlap region is spread with the black matrix layer, the overlap region comprises a plurality of striped segments that define a rectangle; and
    the black matrix layer is formed on only one striped segment that is on one side of the rectangle.

2. A liquid crystal display panel with high cell gap uniformity, comprising:
    a first substrate;
    a second substrate;
    a sealant put between the first and the second substrates and connecting them to define an enclosed space;
    a liquid crystal layer provided in the enclosed space; and
    a black matrix layer formed on one side of the first substrate or one side of the second substrate, with the side of the substrate on which the black matrix layer is formed facing the liqiuid crystal layer;
    wherein an overlap region is formed between the sealant and the first substrate or between the sealant and the second substrate, only part of the overlap region is spread with the black matrix layer, the overlap region comprises a plurality of striped segments that define a rectangle; and
    the black matrix layer is formed on only two striped segments that are on two opposite sides of the rectangle.

3. A method for controlling the cell gap of a liquid crystal display panel, comprising the steps of:
    dividing the liquid crystal display panel into a plurality of zones and measuring the gap thickness for each zone, wherein the zone having a gap thickness higher than a standard value is defined as a thick-gap zone and the zone having a gap thickness lower than a standard value is defined as a thin-gap zone, and the standard value is the average value of the gap thicknesses of all the divided zones;
    recognizing the positions of the thick-gap and the thin-gap zones relative to the adhesive sealant to define a first overlap region, which is formed between the adhesive sealant and the first substrate and between the adhesive sealant and the second substrate and corresponds to the thick-gap zones and a second overlap region, which is formed between the adhesive sealant and the first substrate and between the adhesive sealant and the second substrate and corresponds to the thin-gap zone; and
    forming a black matrix layer of the liquid crystal display panel outside the first overlap region and inside the second overlap region.

4. The method as claimed in claim 3, further comprising the step of comparing the thicknesses of the thick-gap zones with those of the thin-gap zones to determine the thickness of the black matrix layer.

* * * * *